US012572879B2

(12) United States Patent
Moulinec

(10) Patent No.: US 12,572,879 B2
(45) Date of Patent: Mar. 10, 2026

(54) SYSTEM FOR MONITORING LOADING AND UNLOADING

(71) Applicant: VERSA, Saint-Renan (FR)

(72) Inventor: Jacques Moulinec, Saint Cloud (FR)

(73) Assignee: VERSA, Saint-Renan (FR)

( * ) Notice: Subject to any disclaimer, the term of this patent is extended or adjusted under 35 U.S.C. 154(b) by 43 days.

(21) Appl. No.: 18/268,218

(22) PCT Filed: Dec. 17, 2021

(86) PCT No.: PCT/EP2021/086515
§ 371 (c)(1),
(2) Date: Jun. 17, 2023

(87) PCT Pub. No.: WO2022/129540
PCT Pub. Date: Jun. 23, 2022

(65) Prior Publication Data
US 2024/0062136 A1     Feb. 22, 2024

(30) Foreign Application Priority Data

Dec. 18, 2020     (FR) ....................................... 2013643

(51) Int. Cl.
*G06Q 10/08* (2024.01)
*G06Q 10/0833* (2023.01)
(52) U.S. Cl.
CPC ......... *G06Q 10/08* (2013.01); *G06Q 10/0833* (2013.01)
(58) Field of Classification Search
CPC ........................... G06Q 10/08; G06Q 10/0833
See application file for complete search history.

(56) References Cited

U.S. PATENT DOCUMENTS

| | | | |
|---|---|---|---|
| 11,120,267 B1 * | 9/2021 | Pellegrino | .............. G06V 20/35 |
| 2010/0213313 A1 | 8/2010 | Reed et al. | |
| 2015/0145650 A1 * | 5/2015 | Levan | ................ G06Q 10/0833 |
| | | | 340/10.1 |
| 2017/0280125 A1 * | 9/2017 | Brown | ..................... B65G 1/00 |
| 2021/0326544 A1 * | 10/2021 | Jackson | ............. G06K 7/10445 |

FOREIGN PATENT DOCUMENTS

| | | |
|---|---|---|
| EP | 3534332 A1 | 9/2019 |
| EP | 3657415 A1 | 5/2020 |
| FR | 2908108 A1 | 5/2008 |

* cited by examiner

*Primary Examiner* — Kam Wan Ma
(74) *Attorney, Agent, or Firm* — H&I PARTNERS; Chai Im; C. Andrew Im

(57)     ABSTRACT

A system to monitor loading and unloading of a receptacle or of a receptacle support for transporting goods in a container. The system includes a photographing apparatus for taking photographs in front of a zone for monitoring at least a part of the interior of the container, according to an activation parameter from at least one sensor. The photographing apparatus configured to acquire at least one image or one film or any other reproduction of shape described by a cloud of points in at least two colors. The system further includes a database, microcontroller and a network terminal having a data transceiver to exchange data. The sensor of the photographing apparatus is triggered to measure and/or detect descriptive data relating to the transport conditions. The microcontroller associates time information with the descriptive data from the sensor.

11 Claims, 6 Drawing Sheets

SYSTEM FOR MONITORING LOADING AND UNLOADING

RELATED APPLICATIONS

This application is a § 371 application of PCT/EP2021/086515 filed Dec. 17, 2021, which claims priority from French Patent Application No. 2013643 filed Dec. 18, 2020, each of which is incorporated herein by reference in its entirety.

TECHNICAL FIELD OF THE INVENTION

The present invention relates to a system for monitoring loading and unloading of a receptacle or of a receptacle support for transporting goods in a container.

Container means being a partitioned space the logistical function of which is to contain goods for transport thereof. It may for example be the storage space of a semitrailer, of an articulated lorry for road transport, or of a receptacle (more commonly referred to as a container) used in sea transport or carried by a lorry of the container carrier type or by a train.

The present invention applies in particular to all enterprises, public or private bodies, using the transport of goods in handling or packaging units or any other receptacle that can be manipulated in the same way, such as a receptacle support such as a pallet (manipulation by pallet truck).

The term "receptacle support" (or more commonly referred to as a "pallet") used in this document covers any type of goods contained or not in receptacles that can be manipulated by a handling machine with a fork (manual or electric pallet truck, lift truck, stacker, etc.), it may be a case of wooden pallets, plastic pallets, metal pallet, box pallet (wood, plastic, cardboard, mesh) etc.

A few types of standard palette among the most usual have dimensions of A×B with A being a dimension between 100 mm and 2500 mm and B being a dimension between 100 mm and 2500 mm. This therefore includes all the dimensions of conventional pallets such as between 600 m by 800 mm or 800 mm by 1000 mm, of 1000 mm by 1000 mm, of 1100 mm by 1100 mm, of 1200×1200 mm, usually of 1200 mm by 800 mm, etc.

BACKGROUND OF THE INVENTION

One of the aims of the invention is to automatically trace the movements of goods during the loading and unloading phase.

Knowledge of the information relating to the quantity of goods contained in a container or a trailer is useful information for optimizing transport flows in a logistic distribution system. This information is useful to each loading and unloading operation and over the long term for optimizing filling rates.

Making inventories and reports by the handling operators is known, this method, in addition to being tedious, does not allow real-time monitoring of the monitoring of the transport of goods.

Taking photographs by smartphone (the English term for mobile telephone) and reports by the handling operators is known, this method, in addition to being tedious, does not allow real-time monitoring of the transport of goods, and gives rise to errors (poor-quality photograph and non-systematic taking as a function of the time of the operators).

For monitoring the transport of goods, a previous technique consists of using a laser-beam barcode reader. The drawbacks of this technique are that the reading zone must be less than 1 meter in height, the barcode reader is not reliable (of the order of 30% barcode not read) and there is no proof of loading or unloading.

Another technique consists in using a portable terminal with barcode reader of the PDA type (standing for personal digital assistant in English terminology, also called an organizer). The drawbacks of this technique are that it is impossible to guarantee that the identification of the receptacle support is made before the loading (the receptacle support may be loaded and not identified), that it is necessary to pause to identify the goods support, and also that there is no proof of loading or unloading. Human error and forgetfulness are moreover frequent errors.

The document EP3534332, which makes it possible to measure the volume of a trailer and to assist filling according to the volumes that enter, is known. However, the measurements used by the document mentioned above are calculations of volumes and of filling rates. There is no distinction between the receptacle supports and any receptacle support wishing to enter a container can enter therein provided that its volume is in conformity. In addition, it is necessary to know the volume of the trailer before proceeding with the application of the system.

In addition, the document mentioned above does not deal with transfers of receptacle supports to warehouses or other place for storing receptacle supports but only the case of comparing volume in a container with verification of the volume.

None of the current solutions makes it possible to meet all the required needs, namely providing an established monitoring of the quantity of receptacles or receptacle supports of a container, without requiring prior knowledge of the receptacle or of the receptacle support of each container.

OBJECT AND SUMMARY OF THE INVENTION

The present invention aims to remedy these drawbacks with a completely innovative approach.

More precisely, the objective of the invention is to provide a signed monitoring, i.e., with a captured image or film including dated information with at least the date and time for each image or film captured.

The requirements for loading are as follows:

loadings of a container or of a trailer are not always optimized (in particular the floor surface, or the volume or weight transported, etc.);

there is no probative evidence taken automatically without human error that, in implementing loading, account has been taken of rounds and sub-rounds;

there is no measurement of percentage of loading implemented;

there is no proof that, in loading the trailer, the state of the receptacles or receptacle supports and packages, or the number or the unique identification reference thereof, has been respected;

there is no advice given to the driver of the lift truck to optimize the storage of the receptacles and receptacle supports in the trailer or the container.

The requirements for unloading are as follows:

the unloading of a container or of a trailer are not always optimized (in particular with regard to the aspects of checking the qualities of the receptacles or receptacle supports, or with regard to the aspects of validation of the sub-rounds included);

there may be some sub-rounds that are mixed and cause problems: it is necessary to unload sub-rounds partially whereas they do not relate to the current unloaded sub-round, and then to reload the receptacles or receptacle supports that have been temporarily unloaded on the dock and to replace it in the future sub-rounds;

there is no link between the physical reality of movement of the receptacles or receptacle supports and the logical reality expected. There is no probative evidence;

there is no traceability of unloading incidents: pallet fallen and picked up, pallets collapsed and rectified, striking by a fork that damages a pallet, etc.;

there is no possible validation or mass monitoring of the optimization made for a sub-round, and in particular of the price of the transport, which is often indexed to the floor surface or to the volume loaded. This validation and verification of invoicing is not done;

there it is no automatic way of timestamped probative evidence of the state of quality of a quantity of receptacle or receptacle support and package to be unloaded;

the individual photographs via mobiles are not sufficient.

These objectives, as well as others that will emerge hereinafter, are achieved by means of a system 1 for monitoring loading and unloading of a receptacle or of a receptacle support for transporting goods in a container, including:

an apparatus 2 for taking photographs in front of a zone for monitoring at least a part of the interior of said container, according to an activation parameter coming from at least one sensor 8; the photographing apparatus 2 being able to acquire at least one image or one film or any other reproduction of shape described by a cloud of points in at least two colors;

a module 3 for recording photographs, a module 4 for communicating data that includes a data transceiver 27;

a data processing module 7;

remarkable in that the sensor 8 of the photographing apparatus is triggered for measuring and/or detecting descriptive data related to the transport conditions; said data processing module associates time information with the data from the sensor;

said system furthermore includes a module configured for the volume processing of the receptacle or of the receptacle support, by given processing of the data recording module;

the system associates the identification of the receptacle, of the receptacle support or of the receptacle or receptacles with the associated receptacle support in the recording of the data.

By virtue of these provisions, all the previously mentioned requirements are met.

The module for processing the data from at least one photograph makes it possible to identify the identification code of each receptacle or receptacle support.

There is a distinction between the receptacle supports and all the receptacle supports wishing to enter a trailer or container. In the document of the prior art that measures only the volume, there is no distinction if the volume of a receptacle support is in conformity with respect to another with the same volume, there is no alert.

The system operates whatever the initial loading of the container.

The associated receptacle support means that the receptacle or receptacles are indeed the correct receptacle support.

The system makes it possible to identify each receptacle support in an individual manner.

The system makes it possible to manage and locate stacked receptacle supports and to distinguish them. In the same way, the system makes it possible to manage and locate receptacle supports pushed successively and to distinguish them.

The system ensures and guarantees that the correct goods are sent in the correct containers.

The photographing apparatus furthermore includes time-stamping data, and/or various data captured or calculated by the system and associated with the identification by the system.

Sensor 8, 9 means a device transforming the state of a physical quantity observed into a usable quantity.

The communication module is a mobile or cabled network terminal for exchanging data with at least one of the following elements: server, computer, smartphone (the English term for mobile telephone), digital tablet, Cloud (storage alternative developed in the Cloud), and internet. Exchanging data also makes it possible to have access thereto by a mobile application.

The photographing apparatus makes it possible to reproduce a cloud of points of different colors, making it possible to distinguish a shape design.

The photographing apparatus 2 extracts data in accordance with a cloud of points coming from one or more sensors (transmitter or receiver or the sum of the latter two) of waves emitted or of physical radiation or of any nature emitted (light, electromagnetic waves, calculation of any physical dimension or of the gradient thereof, light radiation, heat radiation, nuclear radiation, sound or ultrasound waves, X-rays, etc.): included therein are detectors 8, 9 of any type of wave either used individually or in association of a plurality of sensors for calculations in 2 or 3 dimensions or more; normal photographing apparatus is included therein (HD photographic apparatus, camera, volume sensor, sound or ultrasound sensor, etc.).

Container means transporting goods in a large box made of metal or of other rigid materials by various transport modes or also it may be a case of a trailer of a lorry or compartment of a vehicle or of a container loaded on a train or in a freighter or aircraft.

The invention is advantageously implemented according to the embodiments and variants disclosed below, which are to be considered individually or in accordance with any technically operative combination.

In one embodiment, the module for processing photographs includes a flash or a wave emitter 12 that is triggered during one or more synchronized acquisitions of a photograph. Thus, the photographing apparatus 2 has sufficient brightness to obtain a good quality of image.

In one embodiment, wherein said parameter for activation of the photographing apparatus 2 takes account of at least one of the following items of information:

movement information coming from a movement sensor 11 detecting a movement in the monitoring zone;

movement information coming from a movement sensor 11 detecting a movement in the monitoring zone in proximity to the container;

information of a predetermined duration coming from a clock 10 of a microcontroller 7 or said information of a duration comes from a calculation according to a sensor;

first information from a detection cell 13 of at least one receptacle or a receptacle support, the first detection cell 13 including a first broadcasting sensor 16 and a second broadcasting sensor 17 indicating a passage in proximity to the photographing apparatus 2;

second information from a detection cell, the second detection cell 14 having a first reflection sensor 18 and a second reflection sensor 19, cooperating with a reflector 21 positioned on or cooperating with a processing module 7 for detecting at least one of the following elements: a receptacle, a receptacle support, a machine for handling the receptacle support, any emitter connected to one of the preceding elements, said second detection cell indicating the presence of at least one receptacle in proximity to the photographing apparatus.

The processing module 7 contains a computer program seen as artificial intelligence that has been trained to detect the elements mentioned above. By means of a database, the computer program makes it possible to have a standard vision of certain recognizable elements.

The processing module 7 contains a computer program seeking the physical or shape characteristics making it possible to recognise certain elements.

The processing module 7 contains a computer program weighting the results of the various searches made in accordance with the previous two automatic modes by adapting the weightings to improve the results of the previous searches.

In the context of the present invention, the concept of proximity is of the order of a few millimeters to meters. For example, the proximity is between 0.1 and 20 meters.

The emitter is for example an RFID (the English acronym for radio-frequency identification) tag or a control button that the operator presses in a case of loading or unloading, or a wave reflected by a mirror or wave reflector etc.

In one embodiment, the parameter for activating the photographing apparatus is triggered from said first detection-cell information if the first broadcasting sensor indicates the presence of a passage in proximity to the photographing apparatus, and then the second broadcasting sensor indicates a passage in proximity to the photographing apparatus.

In one embodiment, the parameter for activating the photographing apparatus is triggered from the first detection-cell information and from the second detection-cell information if the second broadcasting sensor indicates a passage in proximity to the photographing apparatus, then the second reflection sensor indicates the presence of at least one receptacle or receptacle support, then the first broadcasting sensor indicates a passage in proximity to the photographing apparatus, and then the first reflection sensor indicates the presence of at least one receptacle or receptacle support in proximity to the photographing apparatus.

In one embodiment, when the parameter for activation of the photographing apparatus is triggered from the information on the movement, said system 1 furthermore includes:

an alarm module including an alarm device 23 cooperating with the communication module to send an incident report to a management terminal 24, or a database, said alarm device 23 being auditory, visual or silent, the management terminal 24 having access to at least one data item from the data recording module.

For example, a database is accessible by internet from any computer, smartphone, Cloud or connected object.

In one embodiment, said system furthermore includes a module for processing data in real time configured to give an indicator of the change in a parameter of the receptacle or of the receptacle support.

The change in a parameter being a calculation of the weight, of radiation, cumulatively or not, of vibrations, cumulatively or not, of variation in physical data (pressure, temperature, etc), cumulatively or not.

The change in the parameter makes it possible to have a comparison with a predetermined threshold such as the expected weight and the actual weight, or the absence of vibration, or change in temperature or pressure within a predefined range.

The processing module is implemented by multimedia-data processing of the photographing apparatus contained in the recording module and can contain an artificial-intelligence module for detecting types of content or of type of receptacle or of receptacle support.

The data processing module includes data prior to the loading, colour, cleanliness, temperature, radiation density, particle density, odour, by any measuring apparatus, in order to compare the change in the transport.

After unloading, the photographing apparatus also transmits measurements for assessing change inside the container.

In one embodiment, one of the sensors of the photographing apparatus is a sensor for geolocation of the container, the data from the geolocation sensor being transmitted to the module for recording data associated with at least one of the descriptive data items related to the transport conditions, of the temperature or hygrometry type, or according to a transport indicator.

The transport indicator is for example a consolidation or an average of indicators detected during the transport or any statistical formula of indicators detected before, during or after transport (the sum of vibrations, quantity of calorific energy received or lost, etc).

The descriptive data are for example a change of a temperature, of waves, of a density, of a radiation, of a movement exceeding a threshold, or reaching a value for any predefined mathematical function, etc.

In one embodiment, the photographing apparatus is located on a gantry in front of the entrance or exit of said container or inside said container.

According to another embodiment, the system processes a plurality of containers or a plurality of container trailers equipped with the system of the present invention.

In one embodiment, the photographing processing module is configured to distinguish the direction of loading or unloading by comparing successive images.

The system makes it possible to identify with certainty and proof by image or film the movements of receptacle supports or receptacles made in the context of precise operations (loading/unloading of a lorry, container, stock transfers, etc.).

In one embodiment, a part of the system is positioned on a movable support 26.

For example, the data system, where there is a reader for identifying the receptacles or receptacle support, is located on a rolling carriage for being positioned in proximity to the container.

In one configuration, the system has some of its hardware components (sensor, camera, etc.) or software components offset on a mobile terminal or multifunction telephone or a tablet for partial or total processing of the functionalities.

BRIEF DESCRIPTION OF THE FIGURES

Other advantages, aims and features of the present invention will emerge from the following description made, for an explanatory and in no way limitative purpose, with regard to the accompanying drawings, wherein.

DESCRIPTION OF EMBODIMENTS

Figure 1:
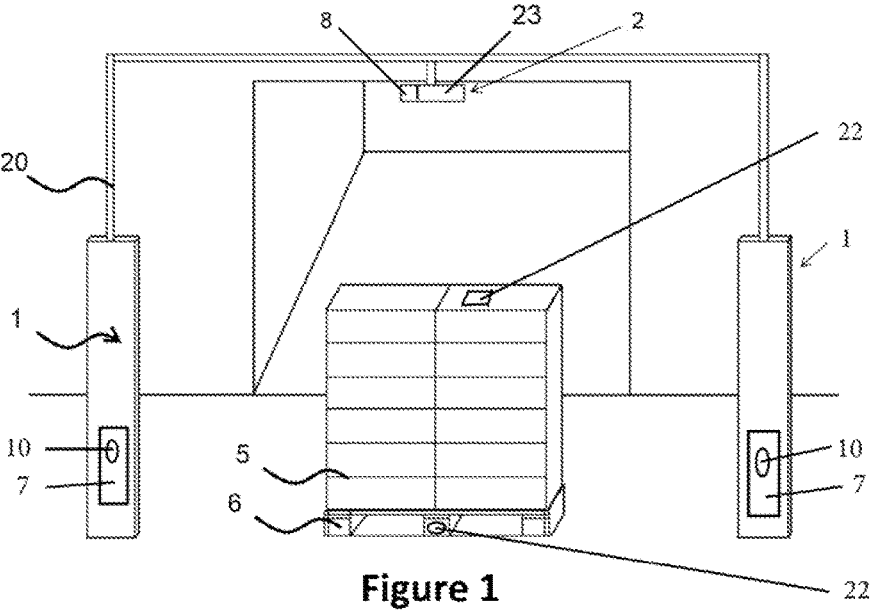
FIG. 1 shows the passage of a receptacle on a receptacle support at a passage point.

FIG. 1 shows the passage of a receptacle 5 on a receptacle support 6 at a passage point with a plurality of photographing apparatus or cameras 2 of the system 1 for monitoring loading and unloading. There is a passage in front of a space that will serve for transport thereof.

The receptacles 5 on a receptacle support 6 correspond to goods on a pallet. The whole passes under a gantry 20 that dynamically makes it possible to have an image or a film of the content or any other reproduction of form described by a cloud of points in at least two colors.

The two colors serve to differentiate the external contours of contents, receptacles 5 or receptacle supports 6, and the interior forms as well as the spaces or unoccupied voids surrounded by content zones.

The two colors serve to differentiate on the contents or receptacle 5 or receptacle support 6 variations in indicators that have taken place before the transport, during the transport or after the transport.

In FIG. 1, there is a single photographing apparatus 2 positioned at the top of the gantry 20. This photographing apparatus 2 makes it possible to observe the depth of the storage zone.

In a variant, not shown, other photographing apparatus 2 are located in each boundary positioned on either side of the passage of the receptacle support 6.

In a variant, not shown, a mobile terminal is used, and the photographing apparatus 2 corresponds to an element of the mobile, i.e., the photographic apparatus of the mobile terminal or an additional sensor attached to the photographic apparatus or to the digital tablet, or a sensor connected to a vision scanner. Thus, the photographing is done by an external operator.

Figure 2:
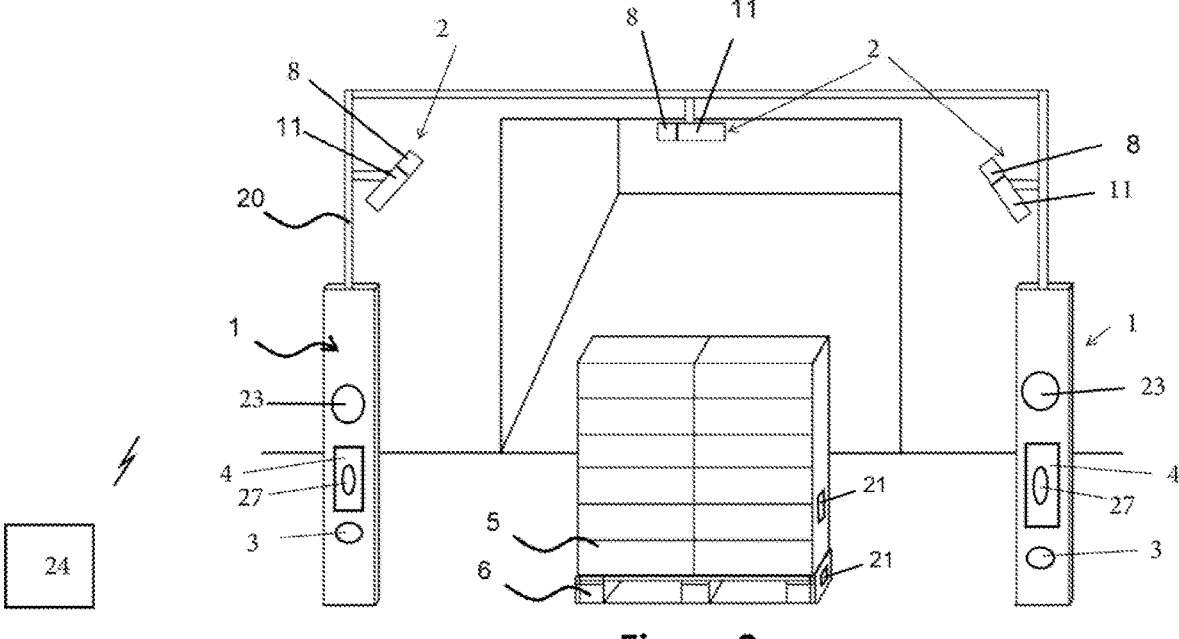
FIG. 2 shows the passage of a receptacle on a receptacle support at a passage point with a plurality of photographing apparatuses.

FIG. 2 shows the passage of a receptacle 5 on a receptacle support 6 at a passage point with a plurality of photographing apparatus 2 of the system 1. FIG. 2 repeats the elements of FIG. 1.

Figure 3:
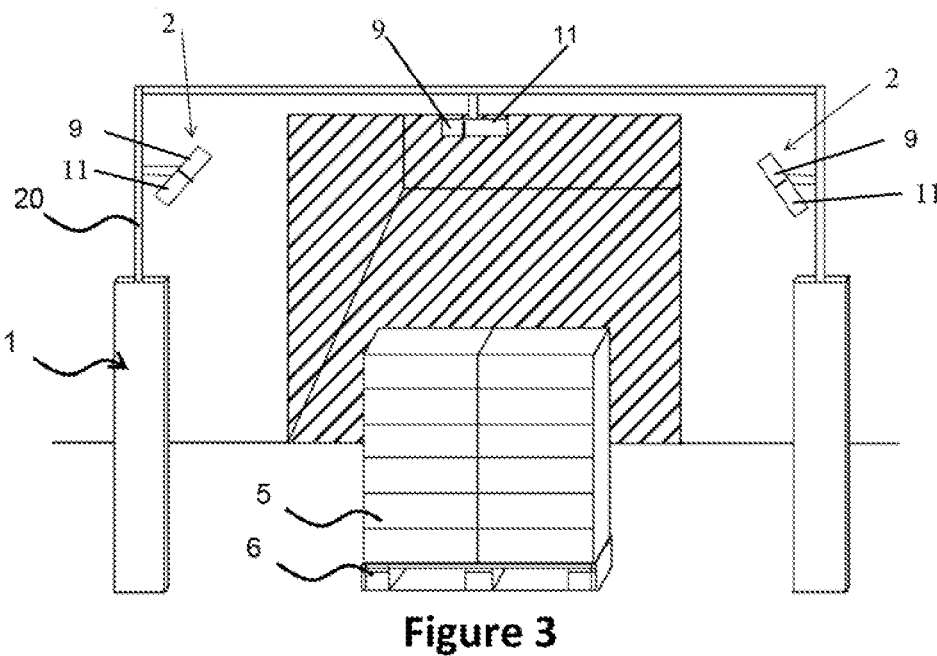
FIG. 3 shows an example implementation of measurement of the volume of the storage space of the receptacles.

FIG. 3 makes it possible to see photographing apparatus 2 having a depth sensor 9 located above at least one receptacle and two others on the side in order to obtain an exhaustive measurement of the dimensions of the receptacle or of the receptacle support. The depth sensors 9 being positioned on a gantry 20 above the passage of a receptacle 5 or of the receptacle support 6. This system 1 makes it possible to take for example a photograph, a film or a cloud of points and to measure the volume of the receptacle 5 or of the receptacle support 6.

In order to make an exhaustive measurement by recovering a plurality of the length and the width, there are two additional depth sensors positioned on each side slightly above each boundary.

A microcontroller 12 makes it possible, using an algorithm for processing the measurements, to reconstruct a three-dimensional vision of the three measurements made of the receptacle or of the receptacle support 6 and to extract therefrom the external dimensions.

The image shows a pallet shape with a truck as well as a driver. Next, an origin is defined and, with the cloud of points giving us the X, Y and Z coordinates, the required volume is calculated by subtracting the truck and the driver. Either from the dimensions of the pallets, which are standard, or from a pre-calibration of the system for measuring the dimensions, it is therefore possible to recover what there is beyond these dimensions.

FIG. 3 shows an example embodiment of measurement of the volume of the storage space of the receptacles 5.

In this example, the three photographing apparatuses 2 make it possible to know the volume to be stored in the storage zone. By knowing the volume of the storage zone, it is possible to deduce the quantity remaining in place to store a maximum number of receptacles 5.

Figure 4:
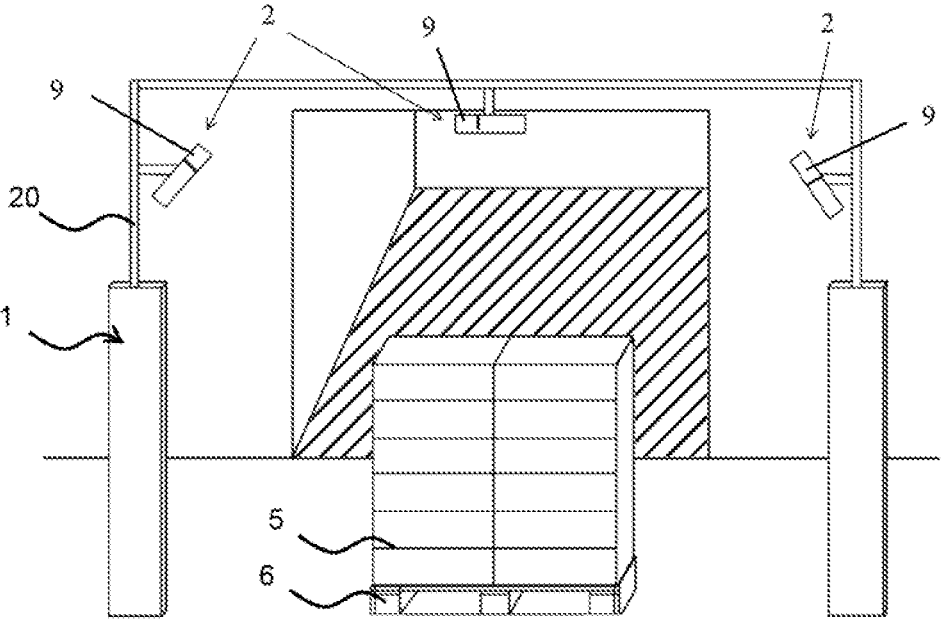
FIG. 4 shows an example implementation of measurement of a surface area of the storage space of the receptacles.

FIG. 4 shows an example implementation of measurement of a surface of the storage space of the receptacles 5.

In this example, the storage surface area is known in advance. By knowing at each entrance, the dimensions of the receptacle support, it is then possible to know or to display on a terminal or a mobile terminal the way to store a maximum number of receptacle supports 6.

Figure 5:
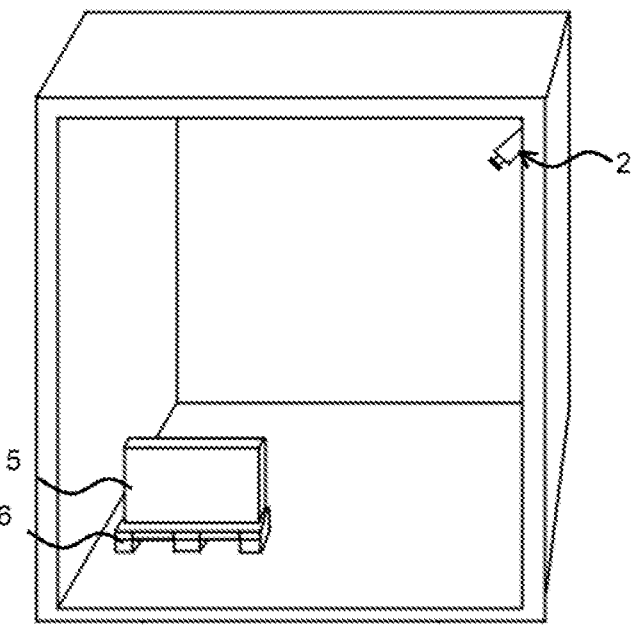
FIG. 5 shows the interior of a container with a receptacle on a receptacle support.

FIG. 5 shows the interior of a container with a receptacle 5 on a receptacle support 6. This figure shows a photographing apparatus 2 contained in a container. It makes it possible to continuously monitor the change in the storage by regular photographs or according to descriptive parameters related to the transport, such as the movement moving a certain threshold or a heat sensor. If the value from the sensor triggers the photographing apparatus 2, then the information coming from the photographing apparatus 2 is sent to the recording module to be processed.

Before loading and after unloading, a measurement is made for calibrating the parameters making it possible to have a correct change during transport.

Figure 6:
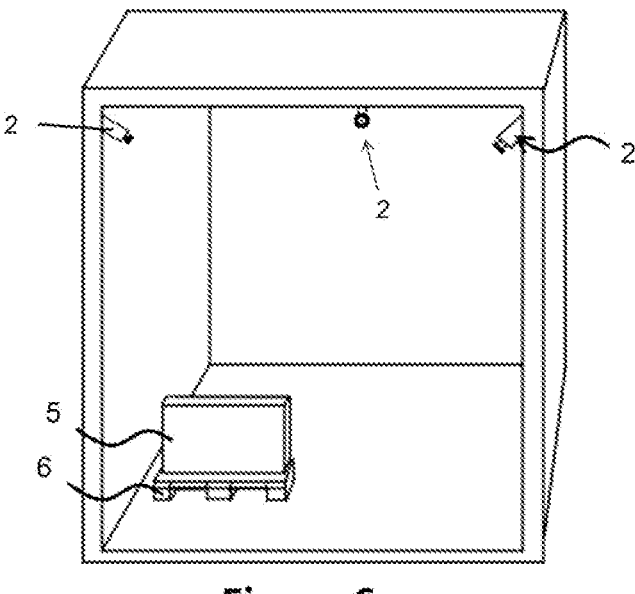
FIG. 6 shows the interior of a container with a receptacle on a receptacle support having a plurality of es.

FIG. 6 shows the interior of a container with a receptacle 5 on a receptacle support 6. This figure shows three photographing apparatuses 2.

The operation is identical to the previous figure with the exception that there is a plurality of photographing apparatuses 2. This is because some loads prevent seeing some parts of the container, and this is why a plurality of photographing apparatuses 2 make it possible to have a global vision.

Figure 7:
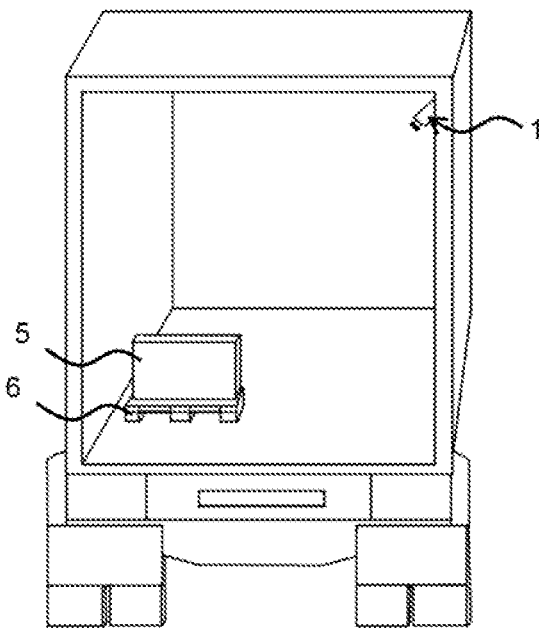
FIG. 7 shows the interior of a container on a lorry.

FIG. 7 shows the interior of a container on a lorry. The operation is identical to the one described previously.

This figure illustrates the module for volume processing of freight in a container.

Figure 8:
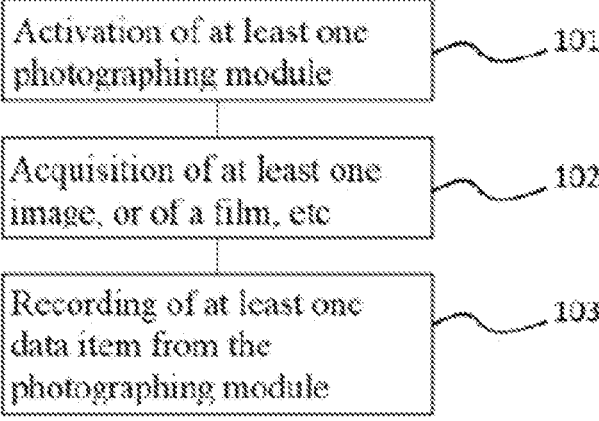
FIG. 8 shows the steps for implementing a method using the elements of the system.
Figure 11:
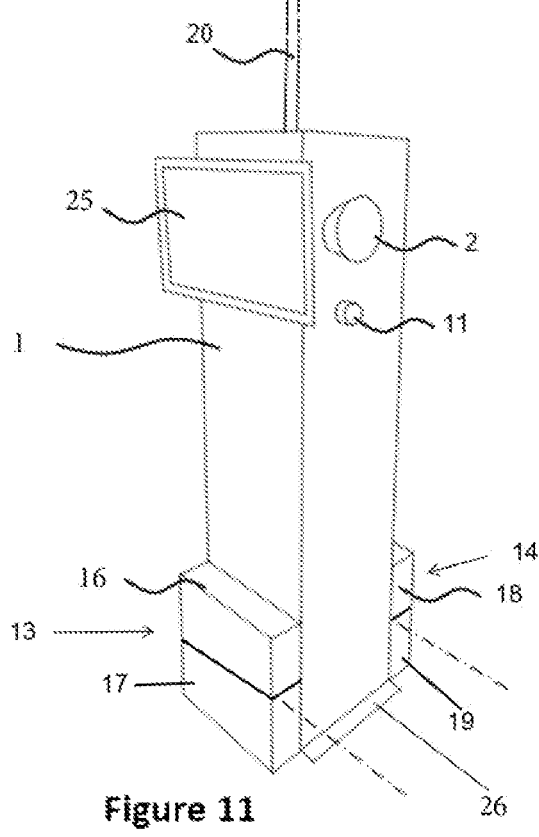
FIG. 11 shows the system to monitor loading and unloading in accordance with an embodiment of the claimed invention.

FIG. 8 shows the steps for implementing a method using the elements of the system 1 of FIGS. 1, 2, 11.

Step 101 makes it possible to activate at least one photographing apparatus 2.

Step 102 makes it possible to acquire at least one image or a film of the content or any other reproduction of form described by a cloud of points in at least two colors. The acquisition of information is triggered either remotely from a mobile terminal from a sensor that detects a value greater than normal operation, such as an abrupt movement.

Step 103 makes it possible to record at least one data item from the photographing apparatus 2.

Figure 9:
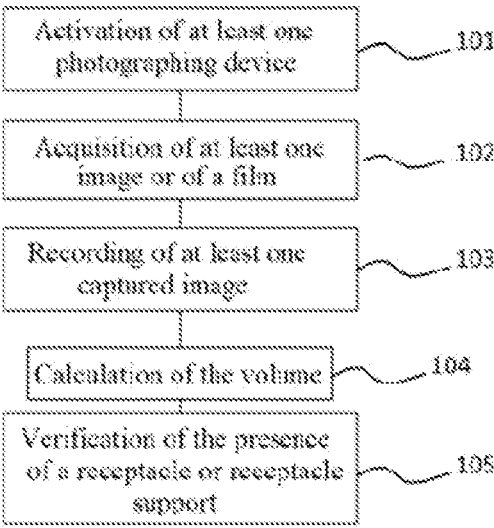
FIG. 9 shows other steps for implementing a method using the elements of the system.

FIG. 9 shows other steps for implementing a method using the elements of the system 1 of FIGS. 1, 2, 11.

Some steps are described above.

Step 104 makes it possible to calculate the volume. From a cloud of points, the origin is calculated to identify the pallet support and to calculate what there is on it. It may be a case of a plurality of views to have a three-dimensional rendition and to be able to calculate the volume.

Step 105 makes it possible to check the presence or not of a receptacle 5 or receptacle support 6.

From an image it is possible to see a barcode and to identify the goods so as to identify whether the receptacle 5 is indeed in the correct transporter.

In a variant, the real-time data-processing module 7 makes it possible to check the presence of a receptacle 5 or receptacle support 6 by various indicators (thermal energy, weight, radiation, diverse indicator density, signal or sound-wave or electromagnetic restoration).

Figure 10:
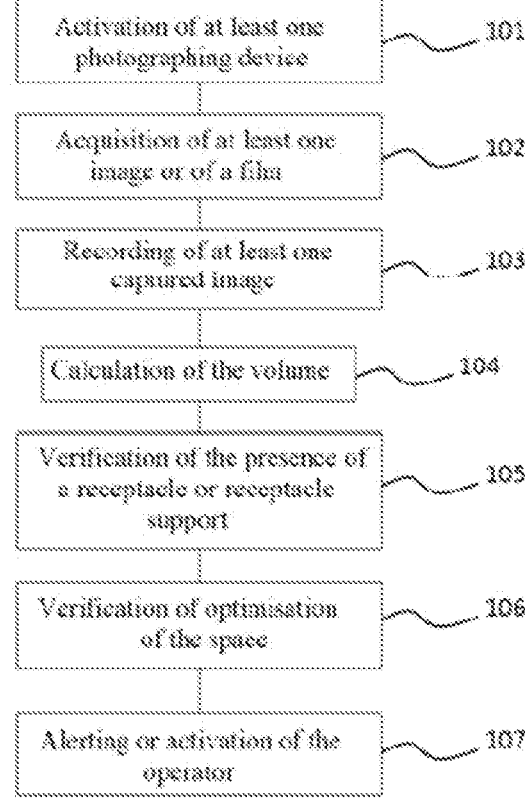
FIG. 10 shows other steps for implementing a method using the elements of the system.

FIG. 10 shows other steps for implementing a method using the elements of the system 1 of FIGS. 1, 2, 11.

Some steps are described above.

Step 106 enables an operator to check whether the storage space is well optimized and guides the operator so that the storage space is used to its maximum.

Step 107 makes it possible to alert if, during transport, a sensor 8 of the photographing apparatus 2 detects an anomaly. For example, in the case of a jolt or in the case of high radiation, such as excessive heat.

Operation

To summarize the operation and the various elements, the system 1 offers the following functionalities:

the photographing or the taking of multimedia content by the photographing apparatus 2 statically inside the trailer or container by slices between each movement of a receptacle 5 or receptacle support 6 inside the trailer or container and construction (loading) or reconstitution of the interior of a trailer or container via the associated software;

photographing dynamically when a receptacle 5 or receptacle support 6 is moved either by a person or by a truck;

instantaneously identifies via a sensor 11 movement of the receptacle 5 or receptacle support 6 that is loaded and unloaded by the truck;

identifies via sensors the entry or exit of a container or container support;

distinguishes in real time the receptacle 5 or receptacle support 6 to which the loading and unloading operation relates and other receptacles or receptacle supports contained in the container or the trailer (either in real time by video with artificial intelligence or by difference between photographs or multimedia data between 2 operations, or by extraction of multimedia data (capture of cloud of points by any type of wave emission, photograph, video, etc.)

alert when an operation (moving a receptacle 5 or receptacle support 6 on a truck) of loading or unloading a receptacle 5 or receptacle support 6 causes either a collapse of the receptacle 5 or receptacle support 6 moved by the truck or a collapse or a significant movement (several cm of movement) of a receptacle 5 or receptacle support 6 in proximity to the receptacle or receptacle support moved;

taking photographs and video films or other multimedia data and archiving at the moments of alerts that are identified as being able to cause damage on the receptacle 5 or receptacle support 6 moved or on the related receptacle or receptacle support;

probative evidence of quality of loading: by photographs or multimedia data (capture of cloud of points by any type of wave emission, photograph, video, etc.) of the bottom of the trailer without receptacle 5 or receptacle support 6, and then sequences of photographs of the bottom of the trailer between each loading or unloading operation;

reconstitutes by volume receptacles 5 or receptacle supports 6 contained in the container or the trailer, and voids above;

reconstitutes in 3D (three dimensions) the interior of the trailer or container;

proposes in real time to the operator the place where the receptacle 5 or receptacle support 6 should be put in the trailer or container to optimize both the 3D space, the surface used on the floor and compliance with rounds and sub-rounds (receptacles and receptacle supports grouped in the trailer or container);

distinguishes the receptacle or receptacle support loaded from the rest of the trailer;

identifies impacts of the unloading on the "decor" and the other receptacles or receptacle supports identifies that nothing has moved around identifies whether the other receptacles 5 or receptacle supports 6 around been modified archives various instants according to a predefined interval or all the operations and impacts connects in real time, for identification on passing the exit boundary of the receptacle or receptacle support, to the software for recognizing barcodes of the pallet. This makes it possible to link the archiving of the evidence and alerts of the receptacle 5 or receptacle support 6 to identification thereof in the information system of the customer.

The processing module makes it possible to synchronize the various views in real time with the flash.

The processing module 10 makes it possible to give in real time at the loading proposals as to the place where the receptacle 5 or receptacle support 6 should be put according to sub-rounds, and to display it on the screen 25 to the operator to guide him.

The processing module 7 makes it possible also to time-stamp the moment of the quality measurement for the receptacle or receptacle support identified.

This timestamping of alerts makes it possible to be identified with standard evidence documents. In one example, it is a case of proof by a multimedia data file (capture of cloud of points by any type of wave emission, photograph, video, etc.) before the alert and after the alert and to be able to compare them.

The video film or multimedia data also serve as proof at the moment when the alert is triggered: the receptacle or receptacle support or package that collapses on the truck, or around the truck, or at the moment when a receptacle or receptacle support is moved.

A mobile application connected in real time to the system that makes it possible to take a video film or photographs of specific points, to send it via mobile connection to the above system, which reprocesses it to include the details therein (in particular the receptacles or receptacle supports).

In a variant, the system is triggered via an internal camera that takes images continuously and, by comparing two successive images, is capable of distinguishing the direction of loading and unloading.

In one version, the system is mobile and is transported from one container to another or from one dock to another.

The system is then connected to the current.

The system is then connected to the cabled or wireless network as via a wave system (Wi-Fi, etc.).

Its screen, connected via a cable or Wi-Fi to the mobile terminal, is disposed on the front wall on the same side as the dock.

The system in mobile version is transported either on a pallet or on wheels 26.

In one configuration, to guarantee that the system is indeed connected to the correct dock, an attachment system is made with a sufficiently short length not to allow corruption of data or error in allocating a receptacle support to a dock.

The invention claimed is:

1. A system to monitor loading and unloading of a receptacle or of a receptacle support for transporting goods in a container, comprising:

a photographing apparatus, comprising at least one first sensor, at least one second sensor and a camera, to take photographs in front of a monitoring zone for monitoring at least a part of an interior of said container, according to an activation parameter coming from said at least one first sensor, the camera configured to acquire at least one image described by a cloud of points in at least two colors;

a database to record said at least one image;

a network terminal comprising a data transceiver to exchange data;

a microcontroller;

said at least one first sensor is configured to measure or detect descriptive data related to transport conditions of the transporting goods and the microcontroller is configured to associate a time information with the descriptive data from said at least one first sensor;

said at least one second sensor is configured to measure a depth of the receptacle or of the receptacle support, said microcontroller being configured to process a volume of the receptacle or of the receptacle support from a depth measurement received from said at least one second sensor; and wherein the microcontroller is configured to calculate and identify the receptacle or the receptacle support and the goods in said container from the cloud of points, and to associate an identification of the receptacle or of the receptacle support with an associated receptacle support in the database based solely on the information from the photographic apparatus, thereby providing tracking of a quantity of the receptacle or of the receptacle support for transporting goods in the container.

2. The system of claim 1, wherein the photographing apparatus comprises a flash or a wave emitter that is triggered during one or more synchronized acquisitions of said at least one image.

3. The system of claim 1, wherein the activation parameter comprises at least one of the following:

movement information from a movement sensor detecting a movement in the monitoring zone or in a zone in proximity of the container;

a predetermined duration information from a clock of the microcontroller;

a first detection-cell information from a first detection cell, the first detection cell comprising a first broadcasting sensor and a second broadcasting sensor indicating a presence of a passage in proximity of the photographing apparatus; and a second detection-cell information from a second detection cell, the second detection cell comprising a first reflection sensor and a second reflection sensor, cooperating with a reflector positioned on the receptacle or the receptacle support, or cooperating with the microcontroller to detect at least one of the following elements:

the receptacle, the receptacle support, a machine for handling the receptacle support, an emitter connected to one of the receptacle, the receptacle support or the machine for handling the receptacle support, the second detection cell indicating a presence of the receptacle or the receptacle support in proximity of the photographing apparatus.

4. The system of claim 3, wherein an activation of the photographing apparatus is triggered from the first detection-cell information if the first broadcasting sensor indicates the presence of the passage in the proximity to the photographing apparatus, and the second broadcasting sensor indicates the presence the passage in the proximity of the photographing apparatus.

5. The system of claim 3, wherein an activation of the photographing apparatus is triggered from the first detection-cell information and from the second detection-cell information if the second broadcasting sensor indicates the presence of the passage in the proximity of the photographing apparatus, the second reflection sensor indicates the presence of said at least one receptacle or the receptacle support, the first broadcasting sensor indicates the passage in the proximity of the photographing apparatus, and the first reflection sensor indicates the presence of said at least one receptacle or the receptacle support in the proximity of the photographing apparatus.

6. The system of claim 3, further comprising an alarm device cooperating with the network terminal to send an incident report to a management terminal or the database in response to the activation parameter being triggered by the movement information, the alarm device being auditory, visual or silent, and wherein the management terminal having access to the database.

7. The system of claim 1, wherein the microcontroller is configured to provide in real time an indicator of a change in a parameter of the receptacle or of the receptacle support.

8. The system of claim 1, wherein one of said at least one first sensor is a geolocation sensor for geolocating the container, data from the geolocation sensor being transmitted to the database to record data associated with at least one of: the descriptive data item related to the transport conditions, a temperature or a hygrometry type of the receptacle or the receptacle support, or a transport indicator of the receptacle or the receptacle support, the transport indicator being sum of vibrations or a quantity of calorific energy received or lost.

9. The system of claim 1, wherein the photographing apparatus is located on a gantry in front of the entrance, an exit for the container or inside the container.

10. The system of claim 1, wherein the microcontroller is configured to distinguish a direction of loading or unloading by comparing successive images.

11. The system of claim 1, wherein a part of the system is positioned on a movable support.

\* \* \* \* \*